United States Patent
Cheng et al.

(10) Patent No.: US 9,805,249 B2
(45) Date of Patent: Oct. 31, 2017

(54) METHOD AND DEVICE FOR RECOGNIZING DANGEROUSNESS OF OBJECT

(71) Applicants: Zhongwei Cheng, Beijing (CN); Shengyin Fan, Beijing (CN)

(72) Inventors: Zhongwei Cheng, Beijing (CN); Shengyin Fan, Beijing (CN)

(73) Assignee: RICOH COMPANY, LTD., Tokyo (JP)

( * ) Notice: Subject to any disclaimer, the term of this patent is extended or adjusted under 35 U.S.C. 154(b) by 110 days.

(21) Appl. No.: 14/926,042

(22) Filed: Oct. 29, 2015

(65) Prior Publication Data

US 2016/0132716 A1  May 12, 2016

(30) Foreign Application Priority Data

Nov. 12, 2014  (CN) .......................... 2014 1 0645601

(51) Int. Cl.
G06K 9/00  (2006.01)

(52) U.S. Cl.
CPC ..... G06K 9/00201 (2013.01); G06K 9/00771 (2013.01)

(58) Field of Classification Search
None
See application file for complete search history.

(56) References Cited

U.S. PATENT DOCUMENTS

| | | | |
|---|---|---|---|
| 8,401,232 B2 | 3/2013 | Fan et al. | |
| 8,896,657 B2 | 11/2014 | Wang et al. | |
| 2008/0004904 A1* | 1/2008 | Tran | A61B 5/0006 705/2 |
| 2010/0302247 A1* | 12/2010 | Perez | G06K 9/00201 345/440 |
| 2011/0025689 A1* | 2/2011 | Perez | A63F 13/63 345/420 |
| 2011/0137527 A1* | 6/2011 | Simon | B60R 1/00 701/45 |

(Continued)

OTHER PUBLICATIONS

"Manifold" [online], Wikipedia, the free encyclopedia, [Searched Oct. 28, 2015], the Internet URL: https://en.wikipedia.org/wiki/Manifold.

*Primary Examiner* — Tsung-Yin Tsai

(74) *Attorney, Agent, or Firm* — Harness, Dickey & Pierce, P.L.C.

(57) ABSTRACT

Disclosed is an object dangerousness recognition method comprising steps of generating, based on an image captured by a stereo camera, a heterogeneous point cloud of an object in the image, each point in the heterogeneous point cloud having depth information and planar image information; determining, based on the depth information and the planar image information of each point in the heterogeneous point cloud, a solid shape of the object, and then, generating a first dangerousness parameter according to the solid shape; determining, based on the depth information and the planar image information of each point in the heterogeneous point cloud, a surface feature of the object, and then, generating a second dangerousness parameter according to the surface feature; and generating, based on the first and second dangerousness parameters, a comprehensive dangerousness parameter of the object.

10 Claims, 6 Drawing Sheets

(56) References Cited

U.S. PATENT DOCUMENTS

| | | | |
|---|---|---|---|
| 2012/0081544 A1* | 4/2012 | Wee | G01S 17/023 348/140 |
| 2013/0095459 A1* | 4/2013 | Tran | A61B 5/6816 434/247 |
| 2013/0096873 A1* | 4/2013 | Rosengaus | G01C 15/002 702/151 |
| 2013/0101157 A1* | 4/2013 | Li | G06K 9/00805 382/103 |
| 2014/0085501 A1* | 3/2014 | Tran | H04N 5/23238 348/222.1 |
| 2014/0136414 A1* | 5/2014 | Abhyanker | G06Q 50/28 705/44 |
| 2014/0148733 A1* | 5/2014 | Stone | A61B 5/004 600/595 |
| 2014/0177915 A1 | 6/2014 | Fan et al. | |
| 2014/0218483 A1 | 8/2014 | Wang et al. | |
| 2014/0236414 A1* | 8/2014 | Droz | G08G 1/161 701/28 |
| 2014/0309893 A1* | 10/2014 | Ricci | H04W 48/04 701/49 |
| 2014/0341464 A1* | 11/2014 | Fan | G06T 5/008 382/154 |
| 2014/0350836 A1* | 11/2014 | Stettner | G01S 17/023 701/301 |
| 2015/0125832 A1* | 5/2015 | Tran | G09B 5/00 434/127 |
| 2015/0198454 A1* | 7/2015 | Moore | G06F 3/167 701/428 |
| 2015/0199566 A1* | 7/2015 | Moore | G06K 9/00442 348/47 |
| 2015/0201181 A1* | 7/2015 | Moore | H04N 13/0239 348/47 |
| 2015/0281676 A1* | 10/2015 | Koehle | H04N 13/0253 348/49 |
| 2015/0286893 A1* | 10/2015 | Straub | G06K 9/52 382/154 |
| 2016/0003946 A1* | 1/2016 | Gilliland | G01S 17/10 356/5.01 |
| 2016/0025499 A1* | 1/2016 | Moore | G01C 21/165 701/1 |
| 2016/0033280 A1* | 2/2016 | Moore | G01C 21/165 701/472 |
| 2016/0059853 A1* | 3/2016 | Yamakoshi | H04L 12/6418 701/36 |
| 2016/0078278 A1* | 3/2016 | Moore | G06K 9/00201 345/8 |
| 2016/0080897 A1* | 3/2016 | Moore | H04W 4/02 340/539.13 |
| 2016/0188977 A1* | 6/2016 | Kearns | G06K 9/00664 348/113 |
| 2016/0335491 A1* | 11/2016 | Wang | G06K 9/00778 |

* cited by examiner

METHOD AND DEVICE FOR RECOGNIZING DANGEROUSNESS OF OBJECT

BACKGROUND OF THE INVENTION

1. Field of the Invention

The present invention relates to a method and device for recognizing the dangerousness of an object, and particularly relates to a method and device for recognizing the dangerousness of an object on the basis of an image captured by a stereo camera.

2. Description of the Related Art

Up to now, monitoring systems have been provided in many public areas such as railway stations, airports, and the like. The discovery and recognition of a dangerous object plays an very important role for establishing an effective monitoring system. This kind of ability of recognizing the dangerousness of an object (also called "object dangerousness") may assist people to detect a hidden security risk in the public areas so as to avoid being wounded, etc.

A method of determining the object dangerousness on the basis of the shape of an object in an image captured by a camera installed in the monitoring system has been proposed. However, this kind of method may easily receive the influence of the change of a view angle, an obstacle, etc., so it may not effectively classify the object dangerousness, and sometimes may not obtain a representative image of the object.

Furthermore a method of determining the object dangerousness by utilizing a detection device different from a well-used camera installed in the monitoring system has been proposed. The detection device may use infrared rays, X-ray computed tomography, or microwave imaging to carry out its detection. However, although this kind of method may acquire data by which some features of the object may be stably expressed, its cost is relatively high, and sometimes it needs an additional device such as a scanner. This may result in inconvenience especially when being used in the public areas.

On the other hand, in the conventional methods of determining the object dangerousness, it is also necessary to use a specific dangerous object model which is predetermined or obtained in advance by conducting machine learning, so as to determine, by carrying out model matching, whether the object is dangerous. This may result in low determination accuracy if the object is significantly different from the specific dangerous object model.

SUMMARY OF THE INVENTION

The objective of the embodiments of the present invention is to provide a method and device for recognizing the dangerousness of an object so as to solve the above-described problems.

According to a first aspect of the present invention, a method of recognizing object dangerousness is provided which includes:

a point cloud generation step of generating, based on an image captured by an stereo camera, a heterogeneous point cloud of an object in the image, each point in the heterogeneous point cloud having depth information and planar image information;

a first parameter generation step of determining, based on the depth information and the planar image information of each point in the heterogeneous point cloud, a solid shape of the object corresponding to the heterogeneous point cloud, and then, generating a first dangerousness parameter according to the solid shape;

a second parameter generation step of determining, based on the depth information and the planar image information of each point in the heterogeneous point cloud, a surface feature of the object corresponding to the heterogeneous point cloud, and then, generating a second dangerousness parameter according to the surface feature; and a comprehensive dangerousness parameter generation step of generating a comprehensive dangerousness parameter of the object corresponding to the heterogeneous point cloud according to the first and second dangerousness parameters.

According to a second aspect of the present invention, a device for recognizing object dangerousness is provided which includes:

a point cloud generation part configured to generate, based on an image captured by an stereo camera, a heterogeneous point cloud of an object in the image, each point in the heterogeneous point cloud having depth information and planar image information;

a first parameter generation part configured to determine, based on the depth information and the planar image information of each point in the heterogeneous point cloud, a solid shape of the object corresponding to the heterogeneous point cloud, and then, to generate a first dangerousness parameter according to the solid shape;

a second parameter generation part configured to determine, based on the depth information and the planar image information of each point in the heterogeneous point cloud, a surface feature of the object corresponding to the heterogeneous point cloud, and then, to generate a second dangerousness parameter according to the surface feature; and a comprehensive dangerousness parameter generation part configured to generate a comprehensive dangerousness parameter of the object corresponding to the heterogeneous point cloud according to the first and second dangerousness parameters.

According to a third aspect of the present invention, a non-transitory machine-readable medium having machine-executable instructions for execution by a processing system is provided. The machine-executable instructions, when executed, cause the processing system to carry out the method of recognizing object dangerousness.

Therefore, in the method and device, by defining, in a general sense, the object dangerousness using the dangerousness parameters, it is possible to avoid generating a specific model for each dangerous object. As a result, the method and device may be more flexibly and effectively applied in an actual monitoring scenario in which a large number of different dangerous objects may appear. In addition, by utilizing both the depth information and the planar image information related to an object in an image captured by a stereo camera so as to determine the first and second dangerousness parameters respectively representing the dangerousness due to the solid shape of the object and the dangerousness due to the surface feature of the object, and then, by determining the dangerousness of the object on the basis of the first and second dangerousness parameters, the method and device may provide a more accurate object dangerousness recognition result, compared to the conventional method and device for determining the object dangerousness.

DETAILED DESCRIPTION OF THE PREFERRED EMBODIMENTS

In order to let those people skilled in the art better understand the present invention, hereinafter the present invention will be concretely described on the basis of the drawings and various embodiments.

A method and device for recognizing the dangerousness of an object according to the embodiments of the present invention may applied in a monitoring system including a stereo camera. For example, the stereo camera may be a two-lens camera. However, the present invention is not limited to this; that is, the stereo camera may be any other proper camera as long as it can obtain the depth information of an object in the image captured by itself. Additionally, in the embodiments of the present invention, the object may be one set in the space monitored by the monitoring system, or may be one held in the hand of a human being occurring in the space monitored by the monitoring system.

Figure 1:
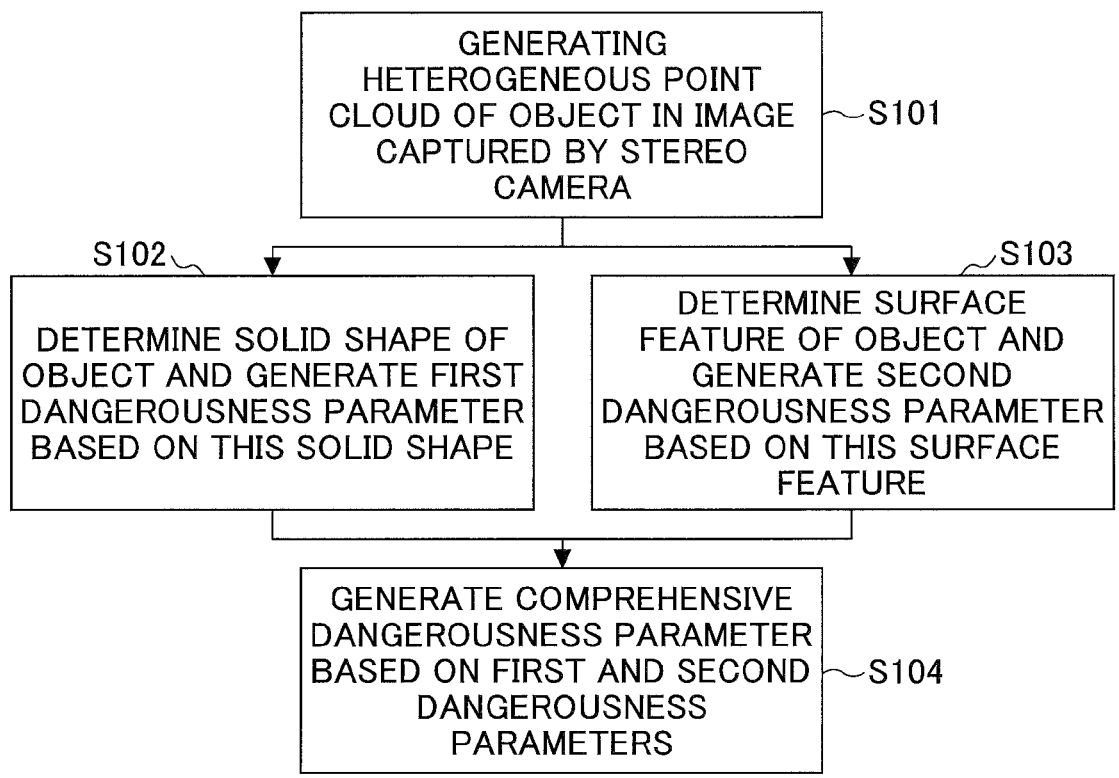
FIG. 1 is a flowchart of a method of recognizing object dangerousness, according to an embodiment of the present invention.

FIG. 1 is a flowchart of a method of recognizing object dangerousness (also called a "recognition method"), according to an embodiment of the present invention.

As shown in FIG. 1, in STEP S101, on the basis of an image captured by a stereo camera, a heterogeneous point cloud of an object therein is generated. Each point in the heterogeneous point cloud has depth information and planar image information.

Figure 2:
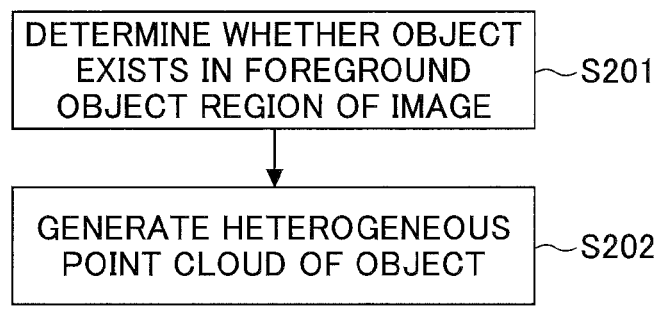
FIG. 2 is a flowchart of a process of generating a heterogeneous point cloud of an object in an image captured by a stereo camera.

FIG. 2 is a flowchart of a process of generating a heterogeneous point cloud of an object in an image captured by a stereo camera.

As shown in FIG. 2, in STEP S201, it is determined whether the object exists in the foreground object region of the image.

For example, in STEP S201 of FIG. 2, it is possible to generate a background model on the basis of a depth map, which may be obtained by a stereo camera, by adopting a background modelling approach such as a static background model based modelling approach or a dynamic background model based modelling approach (e.g., a Gaussian mixture model (GMM) based modelling approach). And then, by using a background subtraction approach, it is possible to extract the foreground pixels in the image so as to acquire a foreground region (i.e., the foreground object region). After that, it is possible to determine whether there is the object in the foreground object region of the image.

On the other hand, in a case where the object is one held in the hand of a human being, it is possible to detect and localize the object in the foreground region of the image. In particular, first it is possible to detect a human body region in the foreground region of the depth map by using any proper human body detection technique. Second it is possible to generate, by utilizing visual information (e.g., a histogram of oriented gradients (HoG) based feature or a scale invariant feature transform (SIFT) based feature), a finer human body model so as to detect the human being in the human body region. Finally it is possible to determine whether the object exists in the hand of the human being. It should be noted that any proper object localization approach can be used here, for example, a sliding window approach, an object feature based approach, or a heuristic search approach.

After it is determined that the object exists, in STEP S202 of FIG. 2, a heterogeneous point cloud $\tilde{P}$ corresponding to the object in the image captured by the stereo camera is generated.

Particularly, in STEP S202 of FIG. 2, first it is possible to acquire the planar image information and the depth information of each pixel of the object in the foreground object region of the image. The planar image information may include planar position information, color information, grayscale information, and/or brightness information of each pixel in the corresponding planar image. The depth information may be obtained based on the disparity of each pixel, which may be calculated on the basis of the image which is captured by the stereo camera (e.g., in case of a two-lens camera, the left and right images captured by the two-lens camera may be used to calculate the disparity of each pixel). Next, regarding each pixel of the object, its coordinates are converted from the camera coordinate system into the three-dimensional world coordinate system. In this way, the heterogeneous point cloud $\tilde{P}$ corresponding to the object can be generated. Here it should be noted that in general, a heterogeneous point cloud refers to a point cloud (i.e., a point set) in which each point (pixel) has not only three-dimensional coordinates but also planar image information such as color information, grayscale information, and/or brightness information.

Refer again to FIG. 1. In STEP S102, on the basis of the depth information and the planar image information of each point in the heterogeneous point cloud, a solid shape (i.e., a three-dimensional shape) of the object corresponding to the heterogeneous point cloud is determined, and then, a first dangerousness parameter is generated according to the solid shape.

Figure 3:
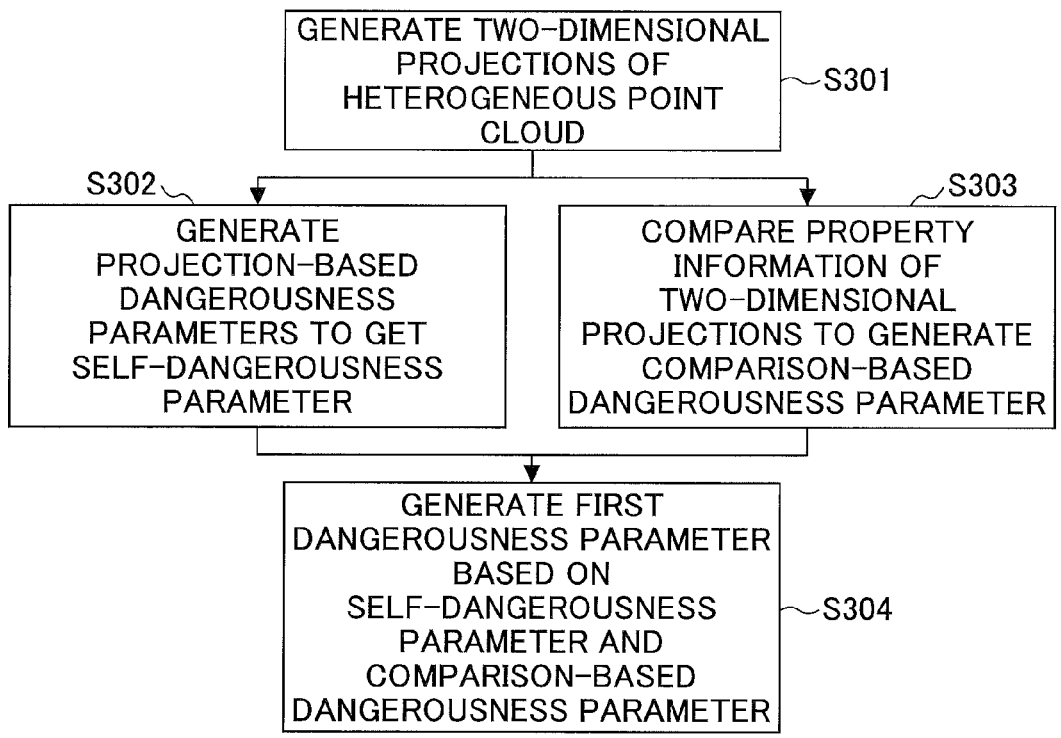
FIG. 3 is a flowchart of a process of generating a first dangerousness parameter, which indicates the dangerousness due to the solid shape of an object, on the basis of the depth information and the planar image information of each point in a heterogeneous point cloud of the object.

FIG. 3 is a flowchart of a process of generating a first dangerousness parameter, which indicates the dangerousness due to the solid shape of an object, on the basis of the depth information and the planar image information of each point in a heterogeneous point cloud of the object.

As shown in FIG. 3, in STEP S301, on the basis of the depth information and the planar image information of each point in the heterogeneous point cloud, plural two-dimensional projections of the heterogeneous point cloud are generated according to plural directions.

For example, it is possible to project the heterogeneous point cloud in the three-dimensional world coordinate system onto the planes defined by any two axes thereof so as to obtain the plural two-dimensional projections.

Again, for example, it is also possible to regard the heterogeneous point cloud as a kind of high dimensional observation of a manifold, and then, by applying the Laplace Beltrami operator, it is possible to generate plural feature projections (i.e., the plural two-dimensional projections) which may be regarded as the low dimensional representations of the manifold (for more information about the manifold, it is possible to refer to https://en.wikipedia.org/wiki/Manifold). In particular, it is possible to assume that each object is essentially represented by an unique low dimensional representation which is embedded in various high dimensional observations of the corresponding object sensed by human beings. As such, by conducting the Laplace Beltrami operator based operation with respect to the relevant heterogeneous point clouds, it is possible to acquire some low dimensional representations on the basis of those complicated and indescribable high dimensional observations of the objects so as to easily describe the property of significance of the relevant eigen-manifolds. Aside from this, it is also possible to suppose that the high dimensional observations of each object observed from different viewing angles hide a same low dimensional manifold of the corresponding object. As such, the plural feature projections generated according to the Laplace Beltrami operator may have the ability of rotation correction, so that it is possible to generate robust and coincident shape descriptions in a complicated environment.

In addition, the approach of generating the plural two-dimensional projections by using the Laplace Beltrami operator is relatively complicated. As such, for example, it is also possible to adopt weighted Laplacian based calculation to approximate the Laplace Beltrami operator based operation. In this way, it is possible to simplify the calculation necessary for obtaining the plural feature projections having the ability of rotation correction. In other words, it is also possible to use an side weight matrix corresponding to a heterogeneous point cloud, calculated on the basis of the depth information and the planar image information of each point in the heterogeneous point cloud so as to generate the plural two-dimensional projections of the heterogeneous point cloud.

Figure 4:
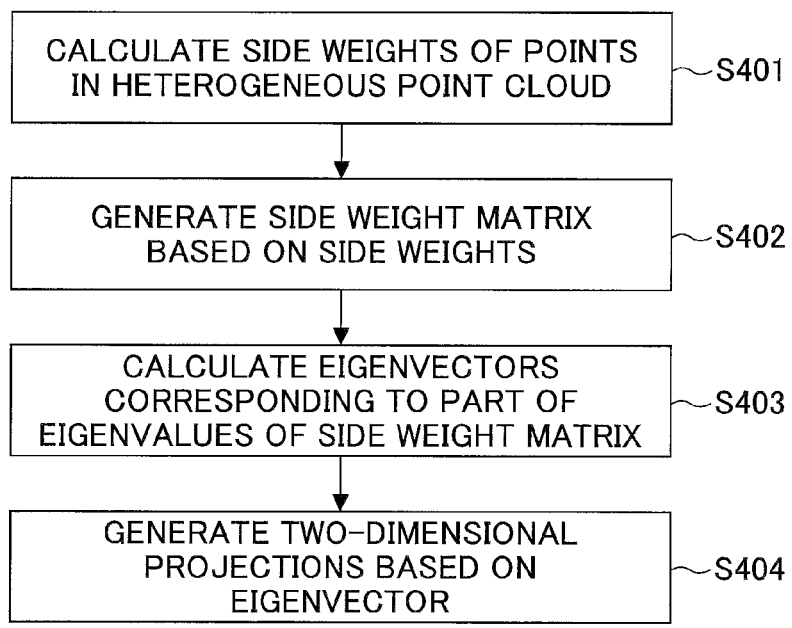
FIG. 4 is flowchart of a process of generating plural two-dimensional projections of a heterogeneous point cloud by utilizing a side weight matrix corresponding to the heterogeneous point cloud, which is calculated on the basis of the depth information and the planar image information of each point in the heterogeneous point cloud.

FIG. 4 is flowchart of a process of generating plural two-dimensional projections of a heterogeneous point cloud by utilizing a side weight matrix corresponding to the heterogeneous point cloud, which is calculated on the basis of the depth information and the planar image information of each point in the heterogeneous point cloud.

As shown in FIG. 4, in STEP S401, the side weights between any two points in the heterogeneous point cloud are calculated on the basis of the depth information and the planar image information of each point in the heterogeneous point cloud. Here each side weight indicates the relation between the corresponding two points in the heterogeneous point cloud. For example, it is possible to calculate the side weight between two points in the heterogeneous point cloud according to the following equation (1).

$$w_{ij} = -e^{\frac{\alpha_1 dist_{3D}(p_i - p_j) + \alpha_2 dist_{visual}(p_i - p_j)}{t}} \quad (1)$$

Here, $w_{ij}$ refers to the side weight; $p_i$ and $p_j$ refer to the two points in the heterogeneous point cloud; $w_{ij}$ refers to the side weight between the two points $p_i$ and $p_j$; $dist_{3D}$ refers to the distance between the two points $p_i$ and $p_j$, calculated on the basis of the three-dimensional coordinates of the two points $p_i$ and $p_j$; $dist_{visual}$ refers to the visual similarity between the two points $p_i$ and $p_j$, calculated on the basis of the planar image information such as color information, grayscale information, and/or brightness information of the two points $p_i$ and $p_j$; $\alpha_1$ and $\alpha_2$ refer to balancing parameters whose values are within a range of [0,1]; and t refers to a real constant. In other words, $dist_{3D}$ may stand for the spatial relation between the two points $p_i$ and $p_j$, and $dist_{visual}$ may stand for the visual similarity between the two points $p_i$ and $p_j$. The value of $w_{ij}$ is within a range of [0,1]. As such, it can be seen from the equation (1) that if the distance between two points in the heterogeneous point cloud is very large, and the visual similarity of the two points is very small, then the corresponding side weight may be set to a value approaching 0; in contrast, it may be set to a value approaching 1.

Next, in STEP S402 of FIG. 4, on the basis of the calculated side weights, a side weight matrix of the heterogeneous point cloud is generated. In particular, it is possible to combine the side weights calculated in STEP S401 of FIG. 4 so as to get the side weight matrix.

After that, it is possible to generate, on the basis of the side weight matrix, plural two-dimensional projections having ability of rotation correction with respect to a three-dimensional object shape. For example, the plural two-dimensional projections may be generated on the basis of the eigenvectors of the side weight matrix. In particular, in STEP S403 of FIG. 4, the eigenvectors corresponding to at least a part of the eigenvalues of the side weight matrix are calculated.

For example, first it is possible to calculate the eigenvalues of the side weight matrix. And then, it is possible to calculate an eigenvector of the side weight matrix of the heterogeneous point cloud according to the following equation (2).

$$Lf = \lambda DF$$

$$L = D - W \quad (2)$$

Here, W denotes the side weight matrix; D denotes a diagonal matrix obtained by summing, column by column, the elements in the side weight matric W; γ denotes an eigenvalue; and f denotes the eigenvector corresponding to the eigenvalue γ.

Then it is possible to choose some non-zero eigenvalues (e.g., three non-zero eigenvalues, i.e., $f_1$, $f_2$, and $f_3$), whose values are minimum, from the calculated eigenvalues for representing the three-dimensional object shape after rotation correction, so as to further calculate the low dimensional representations (i.e., the plural two-dimensional projections) of the object on the basis of the chosen eigenvalues and their corresponding eigenvectors in the follow-on steps. Here it should be noted that the three non-zero eigenvalues, whose values are minimum, are three main directions orthogonal to each other of the object.

Next, in STEP S404 of FIG. 4, on the basis of the calculated eigenvectors, the plural two-dimensional projections are generated. For example, it is possible to generate, on the basis of any two eigenvectors of the eigenvectors obtained in STEP S403 of FIG. 4, plural two-dimensional projections $\tilde{p}_{ij}$.

In a case where in STEP S403 of FIG. 4, the eigenvectors corresponding to three non-zero eigenvalues, whose values are minimum, are selected, it is possible to generate three two-dimensional projections according to the following equation (3).

$$\tilde{p}_{12}=(f_1,f_2)$$
$$\tilde{p}_{13}=(f_1,f_3)$$
$$\tilde{p}_{23}=(f_2,f_3) \tag{3}$$

Here, $\tilde{p}_{12}$, $\tilde{p}_{13}$, and $\tilde{p}_{23}$ stand for three two-dimensional projections able to best express the object shape, respectively.

It should be noted that as may be understood by those people skilled in the art, in order to simplify the process of the recognition method according to this embodiment, it is also possible to calculate fewer two-dimensional projections; on the other hand, in order to improve the accuracy of the recognition method, it is also possible to calculate more two-dimensional projections.

Figure 5A:
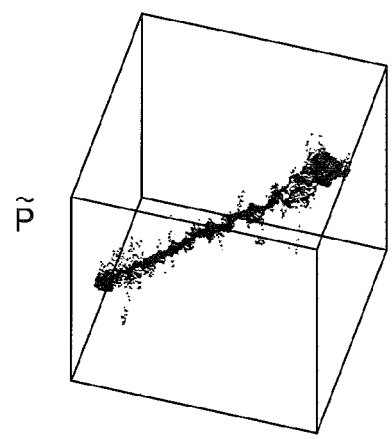
FIG. 5A illustrates an exemplary heterogeneous point cloud generated according to the process shown in FIG. 2 in a case where an object in an image captured by a stereo camera is a stick held in the hand of a human being.

FIG. 5A illustrates an exemplary heterogeneous point cloud $\tilde{P}$ generated according to the process shown in FIG. 2 in a case where an object in an image captured by a stereo camera is a stick held in the hand of a human being.

Figure 5B:
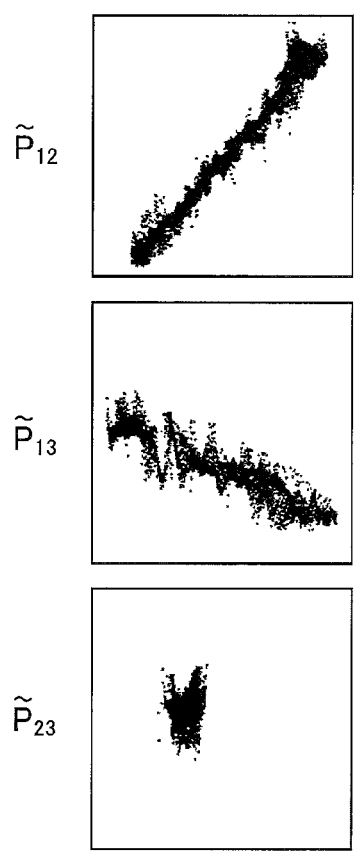
FIG. 5B illustrates exemplary two-dimensional projections generated according to the process shown in FIG. 4 on the basis of the heterogeneous point cloud shown in FIG. 5A.

FIG. 5B illustrates exemplary two-dimensional projections $\tilde{P}_{12}$, $\tilde{P}_{12}$, and $\tilde{P}_{23}$ generated according to the process shown in FIG. 4 on the basis of the heterogeneous point cloud $\tilde{P}$ shown in FIG. 5A.

Refer again to FIG. 3. After obtaining the plural two-dimensional projections, in STEP S302, regarding each of the plural two-dimensional projections, on the basis of its own property information, its projection-based dangerousness parameter is generated. For example, each projection-based dangerousness parameter may be generated on the basis of the property information such as the shape and the size of the object in the corresponding two-dimensional projection. And then, on the basis of the projection-based dangerousness parameters of the respective two-dimensional projections, a self-dangerousness parameter of the heterogeneous point cloud is generated.

For example, it is possible to calculate a general shape of the object on the basis of the plural two-dimensional projections. If the calculated general shape of the object is smooth and pear-shaped, that means the object dangerousness is relatively low. In this case, it is possible to calculate a parameter R related to the general shape of the object by utilizing the following equation (4).

$$R(\tilde{P}_{ij})=\Im(\text{Range}(f_i),\text{Range}(f_j)) \tag{4}$$

Here, the function Range( ) calculates the span of a two-dimensional projection along a direction; for example, it is possible to calculate the difference between the relevant maximum and minimum values along the direction. The function $\Im( )$ is a kind of quantization function for comparison, by which the value difference of the two functions Range($f_i$) and Range($f_j$) may be converted into a range of [0,1]. The closer to 1 the value of the parameter R (also called a "shape related score") is, the lower the object dangerousness is.

Again, for example, it is also possible to calculate the relation between the outline (i.e., the perimeter) and the area of the object on the basis of the plural two-dimensional projections. The larger the value difference between the perimeter and the area of the object is, the higher the object dangerousness is. In this case, it is possible to calculate the relation C between the perimeter and the area of the object according to the following equation (5).

$$C(\tilde{P}_{ij})=\Gamma(\text{Perimeter}(\tilde{P}_{ij}),\text{Area}(\tilde{P}_{ij})) \tag{5}$$

Here, the function Perimeter( ) calculates the outline length of the object; the function Area( ) calculates the area of the object; and the function $\Gamma( )$ calculates the ratio of the values of the functions Perimeter( ) and Area( ), or calculates the normalized difference between the area of the relevant schematic diagram and the area of a circle having the same diameter. The relation C (also called a "complexity related score") may also be quantized into a range of [0,1]. The closer to 1 the complexity related score is, the more dangerous the object is.

The projection-based dangerousness parameter of each of the plural two-dimensional projections includes the parameter R (i.e., the shape related score) related to the general shape of the object in the corresponding two-dimensional projection and the relation C (i.e., the complexity related score) between the outline and the area of the object in the corresponding two-dimensional projection. In a case where three two-dimensional projections have been calculated in advance, it is possible to generate a self-dangerousness parameter SA of the heterogeneous point cloud by employing the following equation (6).

$$SA(\tilde{P})=\Theta(R(\tilde{P}_{12}),R(\tilde{P}_{13}),R(\tilde{P}_{23}),C(\tilde{P}_{12}),C(\tilde{P}_{13}),C(\tilde{P}_{23})) \tag{6}$$

Here, the function $\Theta( )$ may calculate the arithmetic mean value of the respective scores, or may adopt a complicated approach such as a weighted voting approach, so as to calculate the self-dangerousness parameter SA. The value of the self-dangerousness parameter SA may also be within in a range of [0,1].

On the other hand, when an object having a very strange shape is observed from different view angles, very different observation data may be obtained. This kind of object may be a dangerous object. As such, it is possible to calculate a comparison-based dangerousness parameter related to the object shape on the basis of the plural two-dimensional projections (i.e., the plural feature projections). For example, in FIG. 5B, the value difference between any two of $\tilde{P}_{12}$, $\tilde{P}_{13}$, and $\tilde{P}_{23}$ is relatively large, so the probability of the object shown in FIG. 5B being a dangerous object is relatively high.

Hence, in STEP S303 of FIG. 3, it is possible to compare the property information of the plural two-dimensional projections, and then, to generate the comparison-based dangerousness parameter of the heterogeneous point cloud on the basis of the comparison results.

For example, in a case where three two-dimensional projections have been obtained, it is possible to generate a comparison-based dangerousness parameter SS of the heterogeneous point cloud by using the following equation (7).

$$SS(\tilde{P})=(1-\text{Diff}(\tilde{P}_{12},\tilde{P}_{13}))\times(1-\text{Diff}(\tilde{P}_{12},\tilde{P}_{23}))\times(1-\text{Diff}(\tilde{P}_{13},\tilde{P}_{23})) \tag{7}$$

Here, the function Diff( ) compares two two-dimensional projections, and outputs a value within a range of [0,1] so as to express the difference between the two two-dimensional projections. In particular, it is possible to adopt a manner of calculating the area difference between the two two-dimensional projections to express the area inconsistency between the two, or to express that in any other proper manner.

After that, in STEP S304 of FIG. 3, on the basis of the self-dangerousness parameter and the comparison-based dangerousness parameter, the first dangerousness parameter is generated.

For example, it is possible to employ the following equation (8) to generate a first dangerousness parameter $Risk_{shape}$ on the basis of the self-dangerousness parameter and the comparison-based dangerousness parameter of the heterogeneous point cloud.

$$Risk_{shape}(\tilde{P}) = M(SA(\tilde{P}), SS(\tilde{P})) \quad (8)$$

Here, the function M( ) refers to a strategy with respect to the scores SA and SS, and may adopt, for example, a linear regression approach so as to improve its own accuracy. Of course, the present invention is not limited to this. That is, it is also possible to adopt a more complicated approach such as a logistic regression approach to calculate the first dangerousness parameter $Risk_{shape}$. The value of $Risk_{shape}$ is within a range of [0,1]; the larger its value is, the more dangerous the object is.

Refer again to FIG. 1. In STEP S103, on the basis of the depth information and the planar image information of each point in the heterogeneous point cloud, a surface feature of the object corresponding to the heterogeneous point cloud is determined, and then, according to the surface feature, a second dangerousness parameter is generated.

Generally speaking, in a visual monitoring system, a camera is provided at a relatively high position, and may have a very big depression angle. As such, for example, it is possible to conduct coordinate conversion with respect to the heterogeneous point cloud so as to let an observer have a more real visual feeling when he/she observes the object. In this case, it is possible to conduct, on the basis of the depth information and the planar image information of each point in the heterogeneous point cloud, the coordinate conversion with respect to the heterogeneous point cloud. Here the planar image information includes planar position information, as described above. In particular, in the coordinate conversion, regarding those points having same planar position information in the heterogeneous point cloud, only a point thereof having the minimum depth is retained. For instance, it is possible to conduct the coordinate conversion with respect to the heterogeneous point cloud by utilizing the following equation (9).

$$S(Obj) = \quad (9)$$
$$\left\{ (x_w^i, y_w^i, \hat{V}^i) \middle| \forall i \in Obj; \hat{V}^i = Vis^m, m = \arg\min_m Z_w^m \bigg|_{(x_w^m = x_w^i, y_w^m = y_w^i)} \right\}$$

Here, S refers to the object surface information after the coordinate conversion, which reflects the visual observation information sensed by an observer; m refers to an index of a point which is closest to the observer in the heterogeneous point cloud, and may be obtained on the basis of the values of $z_w$ having the same coordinates $(x_w, y_w)$; and $\hat{V}$ refers to the planar image information retained at $(x_w, y_w)$. As depicted above, in the coordinate conversion, only a point, whose depth is minimum, among those points having same planar position information in the heterogeneous point cloud is retained. As such, it is possible to give the retained point the depth information and the planar image information corresponding to the point whose index is m among those points having the same coordinates $(x_w, y_w)$; that is, the relevant information of the other points having the same coordinates $(x_w, y_w)$ may be ignored. After that, it is possible to determine, on the basis of the depth information and planar image information of the respective points on the object surface after the coordinate conversion, the texture and/or material of the object, and then, to generate a second dangerousness parameter according to the texture and/or material.

Figure 6:
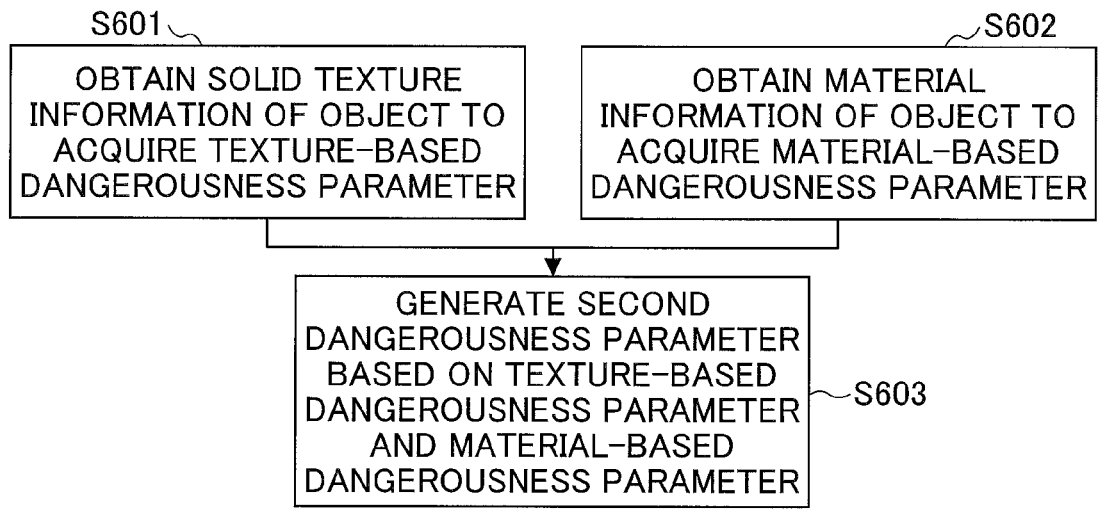
FIG. 6 illustrates a flowchart of a process of determining, based on the depth information and the planar image information of each point in a heterogeneous point cloud of an object, a surface feature of the object, and then, generating a second dangerousness parameter according to the surface feature.

FIG. 6 illustrates a flowchart of a process of determining, based on the depth information and the planar image information of the respective points in a heterogeneous point cloud of an object, a surface feature of the object, and then, generating a second dangerousness parameter according to the surface feature.

Here it should be noted in a case where the coordinate conversion has been conducted with respect to the heterogeneous point cloud as described above, the heterogeneous point cloud after the coordinate conversion is used in the process shown in FIG. 6.

As shown in FIG. 6, in STEP S601, on the basis of the depth information and the planar image information of the respective points in the heterogeneous point cloud, it is possible to obtain solid texture information of the object, and then, to generate a texture-based dangerousness parameter according to the solid texture information. In particular, it is possible to determine a two-dimensional texture of the object on the basis of the planar image information. For example, a two-dimensional texture description approach such as a SIFT, HoG, or texton-based approach may be utilized for determining the two-dimensional texture of the object on the basis of the planar image information. Aside from this, it is also possible to obtain, on the basis of the two-dimensional texture of the object and the depth information, the solid texture information of the object.

Figure 7A:
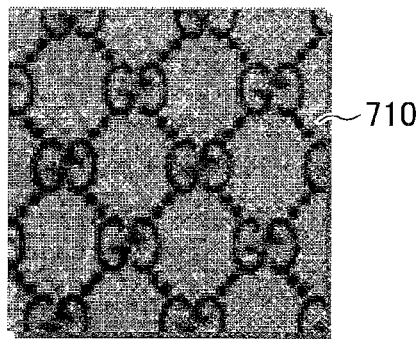
FIG. 7A illustrates an exemplary solid texture of an object, obtained on the basis of the relevant depth information and a two-dimensional texture of the object.

FIG. 7A illustrates an exemplary solid texture of an object 710 obtained on the basis of the relevant depth information and a two-dimensional texture of the object 710.

Figure 7B:
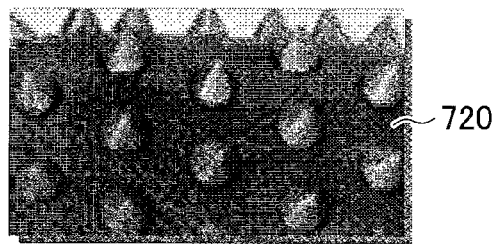
FIG. 7B illustrates another exemplary solid texture of an object, obtained on the basis of the relevant depth information and a two-dimensional texture of the object.

FIG. 7B illustrates an exemplary solid texture of an object 720 obtained on the basis of the relevant depth information and a two-dimensional texture of the object 720.

As shown in FIG. 7A, the solid texture on the surface of the object 710 obtained on the basis of the relevant depth information and the two-dimensional texture of the object 710 is a kind of planar pattern. On the other hand, as shown in FIG. 7B, the solid texture on the surface of the object 720, obtained on the basis of the relevant depth information and the two-dimensional texture of the object 720 is a kind of raised pattern. For example, it is possible to describe the relative distances (altitudes) of local texture segments by employing the following equation (10) in which the spatial relations of the local texture segments are classified into three classes, namely, concave, flat, and convex, which are respectively expressed as $\{-1, 0, 1\}$.

$$t = \begin{cases} (t_i, 0), & \text{depth}(t_i) \approx \text{depth}(t_j) \\ (t_i, 1), & \text{depth}(t_i) > \text{depth}(t_j) \\ (t_i, -1), & \text{depth}(t_i) < \text{depth}(t_j) \end{cases} \quad (10)$$

Here, $t_i$ stands for a local texture segment; $t_j$ stands for a local texture segment (i.e., a neighbor) adjacent to $t_i$; the function depth( ) calculates the distance between a local texture segment and an observer; and t stands for the texture of the local texture segment $t_i$. As may be understood by those people skilled in the art, in general, if there is a concavo-convex texture on the surface of an object, that means the probability of the object being dangerous is relatively high.

Refer again to FIG. 6. In STEP S602, it is possible to acquire, on the basis of the planar image information of the respective points in the heterogeneous point cloud, material information of the object, and then, to generate a material-based dangerousness parameter according to the material information. For example, it is possible to obtain, from the planar image information, the light reflection information of the object surface, and then, to determine the object material according to the light reflection information of the object surface.

After that, in STEP S603 of FIG. 6, on the basis of the texture-based dangerousness parameter and the material-based dangerousness parameter, it is possible to generate the second dangerousness parameter. For example, it is possible to use the following equation (11) to generate a second dangerousness parameter $Risk_{visual}$ on the basis of the texture-based dangerousness parameter and the material-based dangerousness parameter.

$$Risk_{visual}(\tilde{P}) = V(T(S), R(S)) \quad (11)$$

Here, T refers to the texture-based dangerousness parameter; R refers to the material-based dangerousness parameter; and the function V( ) refers to combining the texture-based dangerousness parameter T and the material-based dangerousness parameter R. For instance, the function V( ) may be a function such as a linear regression-based one or a logistic regression-based one. The value range of $Risk_{visual}$ may be [0,1]; the larger its value is, the higher the probability of the object being dangerous is.

Refer again to FIG. 1. After obtaining the first and second dangerousness parameters, in STEP S104, it is possible to generate a comprehensive dangerousness parameter of the object corresponding to the heterogeneous point cloud. For example, when generating the comprehensive dangerousness parameter, it is possible to give weights to the first and second dangerousness parameters, respectively. Again, for example, it is also possible to adjust, according to the historical information related to the recognition accuracies based on the first and second dangerousness parameters and/or the information related to the object feature, the weights of the first and second dangerousness parameters, respectively.

In particular, it is possible to respectively generate, according to the historical information related to the recognition accuracies based on the first and second dangerousness parameters and/or the information related to the object surface, first and second weights for the first and second dangerousness parameters.

For example, it is possible to obtain the first and second weights of the first and second dangerousness parameters by utilizing the following equation (12) according to the historical information related to the recognition accuracies based on the first and second dangerousness parameters, respectively.

$$w_{shape} = \frac{acc_{shape}}{acc_{shape} + acc_{visual}} \quad (12)$$

$$w_{visual} = 1 - w_{shape}$$

Here, $acc_{shape}$ denotes the historical recognition accuracy based on the first dangerousness parameter, whose value range is [0,1]; $acc_{visual}$ denotes the historical recognition accuracy based on the second dangerousness parameter, whose value range is also [0,1]; $w_{shape}$ denotes the first weight of the first dangerousness parameter; and $w_{visual}$ denotes the second weight of the second dangerousness parameter.

Again, for example, if more surfaces of the object can be observed, then it is possible to consider that the object surface feature based estimation is more reliable. As such, in this case, it is possible to increase the second weight of the second dangerousness parameter. In contrast, if less surfaces of the object can be observed, then it is possible to decrease the second weight of the second dangerousness parameter. In other words, it is also possible to obtain, on the basis of the historical information and the object surface information, the first and second weights of the first and second dangerousness parameters according to the following equation (13), respectively.

$$\Delta w = \arctan\left(\frac{\pi}{2} - \frac{R_{object}}{R_{3D-object}} \times \pi\right) \quad (13)$$

$$\hat{w}_{shape} = w_{shape} + \Delta w \times w_{visual}$$

$$\hat{w}_{visual} = 1 - \hat{w}_{shape}$$

Here, $\Delta w$ represents an adjustment coefficient which is used for conducting, according to the object surface information, adjustment with respect to the first and second weights $w_{shape}$ and $w_{visual}$ which are based on the historical information, and its value range is [−1,1]; $R_{object}$ represents the object surface observed in the image; $R_{3D-object}$ represents the real surface of the object in the three-dimensional world coordinate system; $\hat{w}_{shape}$ represents the first weight of the first dangerousness parameter, which is based on the historical information and the object surface information; and $\hat{w}_{visual}$ represents the second weight of the second dangerousness parameter, which is based on the historical information and the object surface information.

After that, it is possible to generate the comprehensive dangerousness parameter on the basis of the first and second dangerousness parameters and the first and second weights by employing, for example, the following equation (14).

$$\text{Dangerousness Score} = \hat{w}_{shape} \times Risk_{shape} + \hat{w}_{visual} \times Risk_{visual} \quad (14)$$

Here, the value range of the comprehensive dangerousness parameter Dangerousness Score is [0,1]; the larger its value is, the higher the probability of the object being dangerous is.

Therefore, in the recognition method according to this embodiment, by defining, in a general sense, the object dangerousness using the dangerousness parameters, it is possible to avoid generating a specific model for each dangerous object. As a result, the recognition method may be more flexibly and effectively applied in an actual monitoring scenario in which a large number of different dangerous objects may exist. In addition, by utilizing both the depth information and the planar image information related to an object in an image obtained by a stereo camera so as to determine the first and second dangerousness parameters respectively representing the dangerousness due to the solid shape of the object and the dangerousness due to the surface feature of the object, and then, by determining the dangerousness of the object on the basis of the first and second dangerousness parameters, the recognition method may provide a more accurate object dangerousness recognition result, compared to the conventional method for determining the object dangerousness.

In what follows, a device for recognizing the dangerousness of an object (also called a "recognition device") according to an embodiment of the present invention will be given by referring to FIG. 8.

Figure 8:
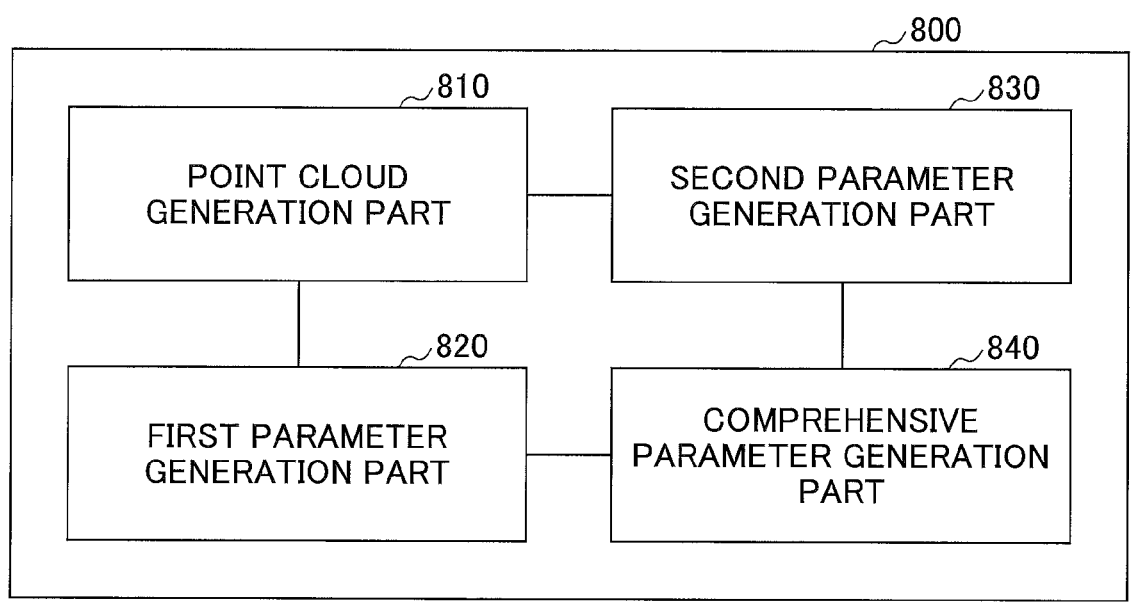
FIG. 8 illustrates an exemplary structural block diagram of a device for recognizing object dangerousness, according to an embodiment of the present invention.

FIG. 8 illustrates an exemplary structural block diagram of a recognition device 800 according to this embodiment.

As shown in FIG. 8, the recognition device 800 includes a point cloud generation part 810, a first parameter generation part 820, a second parameter generation part 830, and a comprehensive parameter generation part 840.

The point cloud generation part 810 of FIG. 8 is configured to be able to implement STEP S101 of FIG. 1.

The first parameter generation part 820 of FIG. 8 is configure to be able to implement STEP S102 of FIG. 1.

Figure 9:
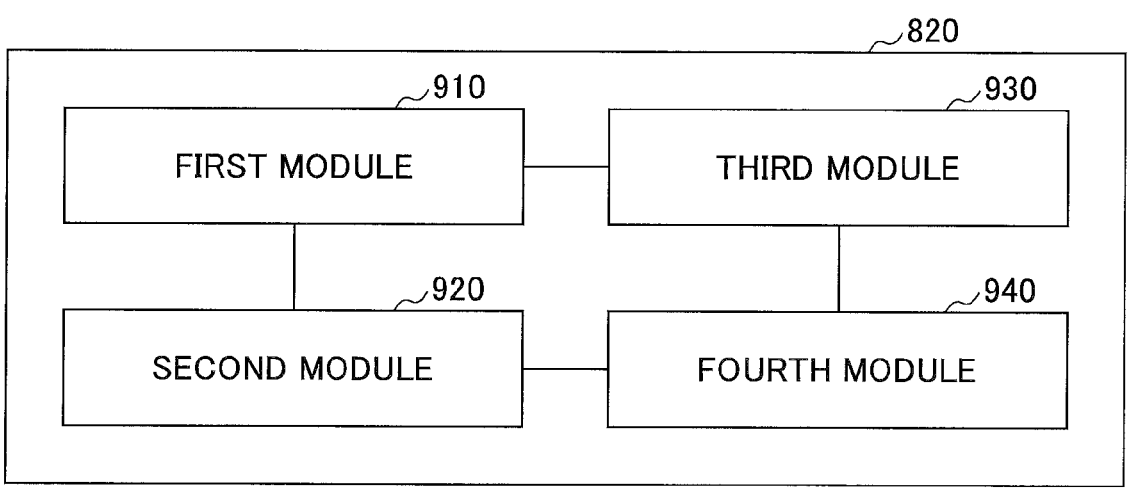
FIG. 9 illustrates an exemplary structural block diagram of a first parameter generation part.

FIG. 9 illustrates an exemplary structural block diagram of the first parameter generation part 820 of FIG. 8.

As shown in FIG. 9, the first parameter generation part 820 includes a projection generation module (also called a "first module") 910, a self-parameter generation module (also called a "second module") 920, a comparison parameter generation module (also called a "third module") 930, and a first parameter generation module (also called a "fourth module") 940 which are configured to be able to implement STEPS S301 to S304 of FIG. 3, respectively.

The second parameter generation part 830 of FIG. 8 is configured to be able to implement STEP S103 of FIG. 1.

Figure 10:
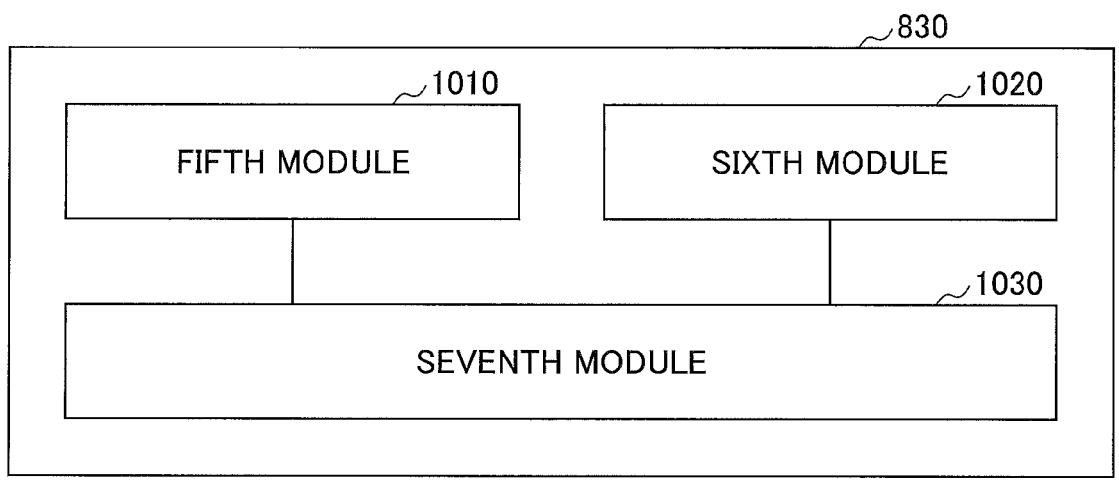
FIG. 10 illustrates an exemplary structural block diagram of a second parameter generation part.

FIG. 10 illustrates an exemplary structural block diagram of the second parameter generation part 830 of FIG. 8.

As shown in FIG. 10, the second parameter generation part 830 includes a texture parameter generation module (also called a "fifth module") 1010, a material parameter generation module (also called a "sixth module") 1020, and a second parameter generation module (also called a "seventh module") 1030 which are configured to be able to implement STEPS S601 to S603 of FIG. 6.

The comprehensive parameter generation part 840 of FIG. 8 is configured to be able to implement STEP S104 of FIG. 1.

Here it should be noted that for more information about the above-mentioned steps, it is possible to refer to the corresponding depictions in the above embodiment. As such, the corresponding depictions are omitted here for the sake of convenience.

In addition, the recognition device according to this embodiment may also achieve the effect of the recognition method according to the above embodiment.

In what follows, a system for recognizing object dangerousness (also called a "recognition system") according to an embodiment of the present invention will be given by referring to FIG. 11.

Figure 11:
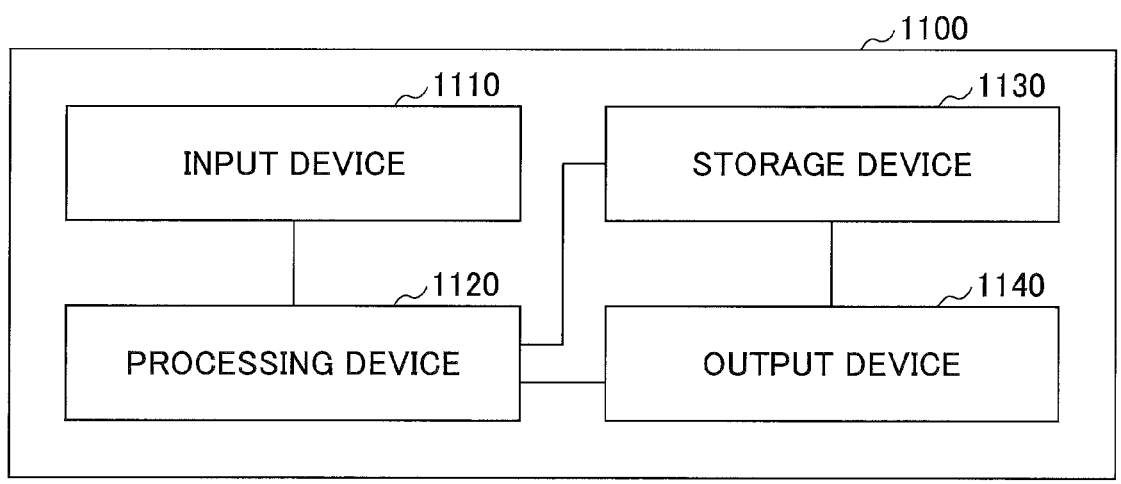
FIG. 11 illustrates a hardware block diagram of a system for recognizing object dangerousness, according to an embodiment of the present invention.

FIG. 11 illustrates a hardware block diagram of a recognition system 1100 according to this embodiment.

As shown in FIG. 11, the recognition system 1100 includes an input device 1110, a processing device 1120, an output device 1130, and a storage device 1140.

The input device 1110 of FIG. 11 is configured to be able to input the relevant images and information for implementing the recognition method according to the above embodiment, for example, left and right images captured by a two-lens camera, the parameters of the two-lens camera, and other necessary information. In particular, the input device 1110 may include but is not limited to a keyboard, a mouse, a communications network, a remote input device connected to the communications network, etc.

The processing device 1120 is configured to be able to implement the above-described recognition method according to the above embodiment. In particular, the processing device 1120 may include but is not limited to a central processing unit of a computer, a chip having processing ability, etc. Furthermore the processing device 1120 may also be connected to a network such as the Internet (not shown in the drawings), and may receive/transmit data from/to a remote server as needed.

The storage device 1130 is configured to be able to store the relevant images and information when implementing the recognition method according to the above embodiment, for example, the image captured by a stereo camera, the heterogeneous point cloud, and the depth information and planar image information of the respective points in the heterogeneous point cloud. In particular, the storage device 1130 may include but is not limited to a random access memory, a read-only memory, a hard disk, a semiconductor memory, etc.

The output device 1140 is configured to be able to output the result, which is obtained by implementing the recognition method according to the above embodiment, to the outside, for example, a display, a printer, a network, and/or a remote output device connected to the network.

In addition, a non-transitory machine-readable medium having machine-executable instructions for execution by a processing system is provide according to an embodiment of the present invention.

The machine-executable instructions, when executed, cause the processing system to carry out the method of recognizing object dangerousness according to the above embodiment.

Here it should be noted that the above respective embodiments are just exemplary ones, and the specific structure and operation of each of them may not be used for limiting the present invention.

Moreover, the embodiments of the present invention may be implemented in any convenient form, for example, using dedicated hardware, or a mixture of dedicated hardware and software. The embodiments of the present invention may be implemented as computer software implemented by one or more networked processing apparatuses. The network may comprise any conventional terrestrial or wireless communications network, such as the Internet. The processing apparatuses may comprise any suitably programmed apparatuses such as a general purpose computer, personal digital assistant, mobile telephone (such as a WAP or 3G-compliant phone) and so on. Since the embodiments of the present invention can be implemented as software, each and every aspect of the present invention thus encompasses computer software implementable on a programmable device.

The computer software may be provided to the programmable device using any storage medium for storing processor-readable code such as a floppy disk, a hard disk, a CD ROM, a magnetic tape device or a solid state memory device.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of storing a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

While the present invention is described with reference to the specific embodiments chosen for purpose of illustration, it should be apparent that the present invention is not limited to these embodiments, but numerous modifications could be made thereto by those people skilled in the art without departing from the basic concept and technical scope of the present invention.

The present application is based on and claims the benefit of priority of Chinese Priority Patent Application No. 201410645601.8 filed on Nov. 12, 2014, the entire contents of which are hereby incorporated by reference.

What is claimed is:

1. A method of recognizing object dangerousness, comprising:
   a point cloud generation step of generating, based on an image captured by a stereo camera, a heterogeneous point cloud of an object in the image, each point in the heterogeneous point cloud having depth information and planar image information;
   a first parameter generation step of determining, based on the depth information and the planar image information of each point in the heterogeneous point cloud, a solid shape of the object corresponding to the heterogeneous point cloud, and then, generating a first dangerousness parameter according to the solid shape;
   a second parameter generation step of determining, based on the depth information and the planar image information of each point in the heterogeneous point cloud, a surface feature of the object corresponding to the heterogeneous point cloud, and then, generating a second dangerousness parameter according to the surface feature; and
   a comprehensive parameter generation step of generating, based on the first and second dangerousness parameters, a comprehensive dangerousness parameter of the object corresponding to the heterogeneous point cloud, wherein, the comprehensive parameter generation step includes:
   generating, according to historical information related to recognition accuracies based on the first and second dangerousness parameters and/or surface information of the object, first and second weights of the first and second dangerousness parameters, respectively;
   utilizing the first dangerousness parameter and the first weight so as to obtain a weighted first dangerousness parameter, and utilizing the second dangerousness parameter and the second weight so as to obtain a weighted second dangerousness parameter; and
   generating, based on the weighted first and second dangerousness parameters, the comprehensive dangerousness parameter.

2. The method according to claim 1, wherein, the first parameter generation step includes:
   a first step of generating, based on the depth information and the planar image information of each point in the heterogeneous point cloud, plural two-dimensional projections of the heterogeneous point cloud according to plural directions;
   a second step of generating, based on property information of each of the plural two-dimensional projections, a projection-based dangerousness parameter of the corresponding two-dimensional projection, and then, generating a self-dangerousness parameter of the heterogeneous point cloud according to the projection-based dangerousness parameter of each of the plural two-dimensional projections;
   a third step of comparing the property information of the plural two-dimensional projections so as to generate a comparison-based dangerousness parameter; and
   a fourth step of generating, based on the self-dangerousness parameter and the comparison-based dangerousness parameter, the first dangerousness parameter.

3. The method according to claim 2, wherein, the first step includes:
   calculating, based on the depth information and the planar image information of each point in the heterogeneous point cloud, plural side weights between any two points in the heterogeneous point cloud, each of the plural side weights representing a relation between the corresponding two points;
   generating, based on the plural side weights, a side weight matrix of the heterogeneous point cloud;
   calculating plural eigenvectors corresponding to at least a part of eigenvalues of the side weight matrix; and
   generating, based on the plural eigenvectors, the plural two-dimensional projections.

4. The method according to claim 1, wherein, the second parameter generation step includes:
   conducting, based on the depth information and the planar image information of each point in the heterogeneous point cloud, coordinate conversion with respect to the heterogeneous point cloud, wherein, the planar image information includes planar position information, and in the coordinate conversion, a point having a minimum depth among plural points having same planar position information in the heterogeneous point cloud is retained; and
   determining, based on the depth information and the planar image information of each point in the heterogeneous point cloud after the coordinate conversion, a texture and/or material of the object corresponding to the heterogeneous point cloud, and then, generating the second dangerousness parameter according to the texture and/or material.

5. The method according to claim 1, wherein, the second parameter generation step includes:
   obtaining, based on the depth information and the planar image information of each point in the heterogeneous point cloud, solid texture information of the object, and then, generating a texture-based dangerousness parameter according to the solid texture information;
   acquiring, based on the planar image information of each point in the heterogeneous point cloud, material information of the object, and then, generating a material-based dangerousness parameter according to the material information; and
   generating, based on the texture-based dangerousness parameter and the material-based dangerousness parameter, the second dangerousness parameter.

6. The method according to claim 1, wherein, the point cloud generation step includes:
   determining whether the object exists in a foreground object region of the image; and
   if it is determined that the object exists, then generating, based on the image, the heterogeneous point cloud of the object.

7. A device for recognizing object dangerousness, comprising:
memory storing computer-readable instructions; and
one or more processors configured to execute the computer-readable instructions such that the one or more processors are configured to perform operations including,
generating, based on an image captured by a stereo camera, a heterogeneous point cloud of an object in the image, each point in the heterogeneous point cloud having depth information and planar image information;
determining, based on the depth information and the planar image information of each point in the heterogeneous point cloud, a solid shape of the object corresponding to the heterogeneous point cloud, and then, to generate a first dangerousness parameter according to the solid shape;
determining, based on the depth information and the planar image information of each point in the heterogeneous point cloud, a surface feature of the object corresponding to the heterogeneous point cloud, and then, to generate a second dangerousness parameter according to the surface feature; and
generating, based on the first and second dangerousness parameters, a comprehensive dangerousness parameter of the object corresponding to the heterogeneous point cloud, wherein, generating the comprehensive dangerousness parameter includes:
generating, according to historical information related to recognition accuracies based on the first and second dangerousness parameters and/or surface information of the object, first and second weights of the first and second dangerousness parameters, respectively;
utilizing the first dangerousness parameter and the first weight so as to obtain a weighted first dangerousness parameter, and utilizing the second dangerousness parameter and the second weight so as to obtain a weighted second dangerousness parameter; and
generating, based on the weighted first and second dangerousness parameters, the comprehensive dangerousness parameter.

8. The device according to claim 7, wherein, the one or more processors are further configured to perform operations including,
generating, based on the depth information and the planar image information of each point in the heterogeneous point cloud, plural two-dimensional projections of the heterogeneous point cloud according to plural directions;
generating, based on property information of each of the plural two-dimensional projections, a projection-based dangerousness parameter of the corresponding two-dimensional projection, and then, to generate a self-dangerousness parameter of the heterogeneous point cloud according to the projection-based dangerousness parameter of each of the plural two-dimensional projections;
comparing the property information of the plural two-dimensional projections so as to generate a comparison-based dangerousness parameter; and
generating, based on the self-dangerousness parameter and the comparison-based dangerousness parameter, the first dangerousness parameter.

9. The device according to claim 8, wherein, the one or more processors are further configured to perform operations including,
obtaining, based on the depth information and the planar image information of each point in the heterogeneous point cloud, solid texture information of the object, and then, to generate a texture-based dangerousness parameter according to the solid texture information;
acquiring, based on the planar image information of each point in the heterogeneous point cloud, material information of the object, and then, to generate a material-based dangerousness parameter according to the material information; and
generating, based on the texture-based dangerousness parameter and the material-based dangerousness parameter, the second dangerousness parameter.

10. A non-transitory machine-readable medium having machine-executable instructions for execution by a processing system, wherein, the machine-executable instructions, when executed, cause the processing system to carry out the method according to claim 1.

* * * * *